UNITED STATES PATENT OFFICE 2,070,146

AROMATIC ARSONIC ACIDS AND PROCESS OF PREPARING THEM

Karl Streitwolf, Frankfort-on-the-Main, Alfred Fehrle, Bad Soden in Taunus, and Hubert Oesterlin, Frankfort-on-the-Main, Germany, assignors to Winthrop Chemical Company, Inc., New York, N. Y., a corporation of New York No Drawing. Application July 22, 1930, Serial No. 469,924. In Germany September 4, 1929

14 Claims. (Cl. 260—14)

The present invention relates to aromatic arsonic acids and a process of preparing them.

We have found that halogen-acylamino-benzene-arsonic acids can be transformed into ester derivatives by treating them with alkali metal salts of carboxylic acids. The following formula illustrates the transformation:

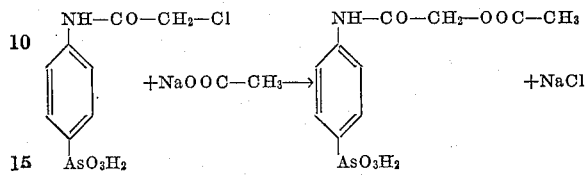

These new compounds have a small toxicity and a very good effect especially on trypanosoma diseases.

The new arsonic acids yield with alkalies, ammonia and organic bases, for instance ethanolamine, piperidine, diethylamine and the like, water-soluble salts.

By partial saponification the therapeutically important hydroxy-acylamino-arylarsenic compounds are obtained by heating the ester derivatives with diluted alkalies.

The following examples serve to illustrate the invention, but they are not intended to limit it thereto.

(1) To a solution of 81.6 grams of crystallized sodium acetate in 700 cc. of water are added 58.7 grams of 4-chloro-acetylamino-benzene-arsonic acid and the whole is boiled for 2 hours in a reflux apparatus. The filtered solution is cooled and mixed with hydrochloric acid until it shows an acid reaction to Congo paper. The 4-acetoxy-acetyl-amino-benzene-arsonic acid then crystallizes from the solution. The separated product is recrystallized from water. It is sparingly soluble in methyl alcohol and glacial acetic acid, very difficultly soluble in ethyl alcohol, readily soluble in acetic acid of 50% strength, insoluble in acetone and ether. Melting point above 270° C.

(2) 61.2 grams of isovaleric acid are dissolved in 300 cc. of 2 normal caustic soda solution and 400 cc. of water. 58.7 grams of 4-chloroacetyl-amino-benzene-arsonic acid are added to the solution, the whole is boiled for 2 hours in a reflux apparatus and filtered. 220 cc. of 2 normal hydrochloric acid are added to the cooled filtrate. The acid which at first is precipitated in an oily form, soon becomes solid. It is purified by recrystallizing it from water. The acid is sparingly soluble in methyl alcohol and glacial acetic acid, very difficultly soluble in ethyl alcohol, well soluble in acetic acid of 50% strength, insoluble in acetone and ether. Melting point: above 270° C.

(3) 61.2 grams of isovaleric acid are dissolved as indicated in Example 2 and 61.5 grams of 2-methyl-4-chloracetylaminobenzene-arsonic acid are added to the solution. The filtered solution is boiled for 2 hours and worked up as above indicated. The 4-isovaleric-oxy-acetyl-amino-2-methyl-1-benzene-arsonic acid thus produced is recrystallized from water. The acid is well soluble in methyl alcohol and ethyl alcohol, acetic acid of 50% strength and glacial acetic acid, difficultly soluble in acetone, insoluble in ether. Melting point: 155° C.–157° C.

(4) 52.8 grams of crotonic acid are dissolved in caustic soda solution, as indicated in Example 3, and the solution is boiled after addition of 58.7 grams of 4-chloracetylamino-benzene-arsonic acid. The reaction product crystallizes from the cooled filtrate. It is filtered by suction and suspended in water, dissolved by addition of 2 normal caustic soda solution and the filtered solution is poured into 2 normal hydrochloric acid. The 4-crotonoxy-acetylamino-benzene-arsonic acid thus precipitated is filtered by suction, washed with water, acetone and ether and dried. The new arsonic acid is sparingly soluble in water, better soluble in methyl alcohol, very difficultly soluble in ethyl alcohol, readily soluble in acetic acid of 50% strength, insoluble in acetone and ether. Melting point above 270° C.

(5) To a solution of 52.8 grams of crotonic acid in caustic soda solution prepared according to Example 4 are added 61.5 grams of 4-chloracetyl-amino-2-methylbenzene-arsonic acid and the solution is boiled as above indicated. The ester formed is recrystallized from methyl alcohol. It is difficultly soluble in water, better soluble in ethyl alcohol and acetic acid of 50% strength and glacial acetic acid, insoluble in acetone and ether. It melts at 205° C. while decomposing.

(6) To a solution of 73.2 grams of benzoic acid in 300 cc. of 2 normal caustic soda solution and 400 cc. of water are added 58.7 grams of 4-chloracetylaminobenzene-arsonic acid and the whole is boiled for 2 hours in a reflux apparatus. From the cooled filtrate 35 grams of ester crystallize which is washed with water, acetone and ether and dried. Fine needles are obtained which are difficultly soluble in water, ethyl alcohol and methyl alcohol. Melting point above 270° C.

(7) To a solution of 52.8 grams of crotonic acid in caustic soda solution prepared according to Example 5 are added 65.6 grams of 4-chlor-3-chloracetylaminobenzene-arsonic acid and the solution is boiled for 2 hours in a reflux apparatus. The ester crystallizes from the cooled filtrate and is recrystallized from water. Yield: 40 grams. Soft needles are obtained which are easily soluble in methyl alcohol and ethyl alcohol, insoluble in acetone and ether. Melting point 190° C.–192° C.

(8) To a solution of 73.2 grams of benzoic acid in 300 cc. of 2 normal caustic soda solution and 400 cc. of water are added 65.6 grams of 4-chlor-3-chloracetylaminobenzene-arsonic acid and the solution is boiled for 2 hours in a reflux apparatus. The reaction product crystallized from the cooled filtrate is washed with water, acetone and ether and dried. Yield: 35 grams. The product is easily soluble in methyl alcohol, sparingly soluble in ethyl alcohol, very difficultly soluble in water. Melting point: 186° C.–188° C.

(9) To a solution of 52.8 grams of crotonic acid in caustic soda solution according to the above-given examples are added 58.7 grams of 3-chloracetylaminobenzene-arsonic acid and the solution is boiled as above indicated. From the cooled filtrate 32 grams of the ester formed crystallize, which is recrystallized from water. Hair-like needles are obtained which are difficultly soluble in methyl alcohol and ethyl alcohol. Melting point 232° C.–233° C.

(10) To a solution of 73.2 grams of benzoic acid in caustic soda solution according to Example 7, are added 58.7 grams of 3-chloracetyl-aminobenzene-arsonic acid and the whole is boiled as indicated. The ester crystallizes from the filtrate. Yield: 40 grams. The product is soluble in methyl alcohol and ethyl alcohol, very difficultly soluble in water. Melting point 230° C.–232° C.

(11) To a solution of 99 grams of α-bromoisocrotonic acid in 300 cc. of 2 normal caustic potash solution and 400 cc. of water are added 58.7 grams of 4-chloracetylaminobenzene-arsonic acid and the whole is boiled for 2 hours in a reflux apparatus. From the hot filtered solution the ester formed crystallizes in the form of bright laminae and is recrystallized from dilute sodium acetate solution. Yield: 38 grams. It is soluble in methyl alcohol and ethyl alcohol. Melting point: 268° C.–270° C.

(12) 31.7 grams of the 4-acetoxy-acetyl-aminobenzene-arsonic acid (prepared according to Example 1) are dissolved in 109 cc. of water and 8.3 cc. of caustic soda solution (40° Bé.) and another 8.3 cc. of the same caustic soda solution are added to the solution. After having boiled for 1 hour the solution is filtered and cooled. The sodium salt of the 4-glycolylaminobenzene-arsonic acid crystallizes from the filtrate. The free acid crystallizes from the aqueous solution of the sodium salt acidified with hydrochloric acid. Yield: 18 grams.

The corresponding quantity (35.9 grams) of 4-isovaleric-oxy-acetylamino-benzene arsonic acid (prepared as indicated in Example 2) or the corresponding quantity (34.3 grams) of 4-crotonoxy-acetylaminobenzene arsonic acid (prepared as indicated in Example 4) yield in an analogous manner the same acid. The yields amount to 16–20 grams.

(13) The 2-methyl-4-glycolylaminobenzene-arsonic acid is obtained by treating in the described manner, for instance 35.7 grams of 2-methyl-4-crotonoxy-acetyl-amino-benzene-arsonic acid or 37.3 grams of the corresponding isovaleryl ester (prepared as indicated in Example 5 or Example 3). The yield amounts to about 18 grams.

(14) 34.4 grams of 3-crotonoxy-acetyl-aminobenzene-arsonic acid, obtainable from 3-chloracetylamino-benzene-arsonic acid and sodium crotonate (prepared according to Example 9), are dissolved in 100 cc. of 2 normal caustic soda solution and boiled for 1½ hours in a reflux apparatus. On addition of hydrochloric acid the 3-glycolylaminobenzene-arsonic acid crystallizes from the filtrate. The yield amounts to 24 grams. The acid is difficultly soluble in water, ethyl alcohol and methyl alcohol.

(15) 37.7 grams of 3-crotonoxy-acetyl-amino-4-chlorobenzene-arsonic acid (prepared as indicated in Example 7) are dissolved in 100 cc. of 2 normal caustic soda solution and boiled for 1 hour in a reflux apparatus. On addition of hydrochloric acid, the 4-chloro-3-glycolylaminobenzene-arsonic acid is separated. The yield amounts to 27 grams. The product is scarcely soluble in water, very difficultly soluble in methyl alcohol and ethyl alcohol.

We claim:

1. The process which consists in heating in an aqueous solution a compound of the following formula

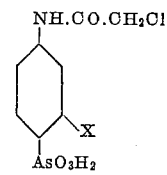

wherein X stands for a substituent of the group consisting of hydrogen and methyl, with a sodium salt of a carboxylic acid of the group consisting of acetic acid, isovaleric acid and crotonic acid.

2. The process which consists in heating in an aqueous solution a compound of the following formula

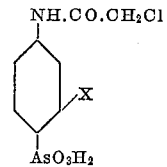

wherein X stands for a substituent of the group consisting of hydrogen and methyl, with a sodium salt of a carboxylic acid of the group consisting of acetic acid, isovaleric acid and crotonic acid, and heating the product formed thereby with a solution of caustic soda.

3. The process which consists in heating in an aqueous solution a compound of the following formula

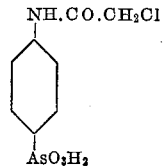

with sodium acetate.

4. The process which consists in heating in an aqueous solution a compound of the following formula

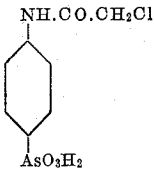

with sodium acetate and heating the product formed thereby with a diluted caustic soda solution.

5. The process which consists in treating a compound of the following formula:

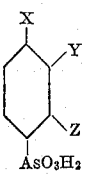

wherein X stands for a substituent of the group consisting of H, Cl and —NH.CO.CH$_2$Cl, and Y stands for a substituent of the group consisting of H and —NH.CO.CH$_2$Cl, and wherein Z stands for a substituent of the group consisting of methyl and H, only one of the substituents X and Y being —NH.CO.CH$_2$Cl and Z being methyl when Y is H with an alkali metal salt of a mono-carboxylic lower aliphatic acid.

6. The process which consists in treating a compound of the following formula

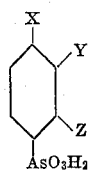

wherein X stands for a substituent of the group consisting of H, Cl and —NH.CO.CH$_2$Cl, and Y stands for a substituent of the group consisting of H and —NH.CO.CH$_2$Cl, and wherein Z stands for a substituent of the group consisting of methyl and H, only one of the substituents X and Y being —NH.CO.CH$_2$Cl and Z being methyl when Y is H with an alkali metal salt of a mono-carboxylic acid of the lower aliphatic series, and heating the product formed thereby with alkali metal hydroxides.

7. The process which consists in treating in the presence of a solvent a compound of the following formula

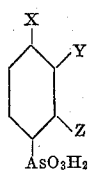

wherein X stands for a substituent of the group consisting of H, Cl and —NH.CO.CH$_2$Cl, and Y stands for a substituent of the group consisting of H and —NH.CO.CH$_2$Cl, and wherein Z stands for a substituent of the group consisting of methyl and H, only one of the substituents X and Y being —NH.CO.CH$_2$Cl and Z being methyl when Y is H with a sodium salt of a carboxylic acid of the group consisting of acetic acid, isovaleric acid and crotonic acid, and heating the product formed thereby with an alkali metal hydroxide.

8. The process which consists in treating in the presence of a solvent a compound of the following formula:

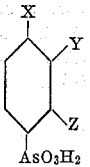

wherein X stands for a substituent of the group consisting of H, Cl and —NH.CO.CH$_2$Cl, Y stands for a substituent of the group consisting of H and —NH.CO.CH$_2$Cl, and Z stands for a substituent of the group consisting of methyl and H, only one of the substituents X and Y being —NH.CO.CH$_2$Cl and Z being methyl when Y is H with the sodium salt of acetic acid.

9. The process which consists in treating in the presence of a solvent a compound of the following formula:

wherein X stands for a substituent of the group consisting of H, Cl and —NH.CO.CH$_2$Cl, Y stands for a substituent of the group consisting of H and —NH.CO.CH$_2$Cl, and Z stands for a substituent of the group consisting of methyl and H, only one of the substituents X and Y being —NH.CO.CH$_2$Cl and Z being methyl when Y is H with the sodium salt of crotonic acid.

10. The compounds of the following formula:

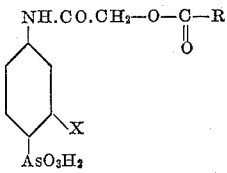

wherein X stands for a substituent of the group consisting of hydrogen and methyl and R stands for a substituent of the group consisting of —CH$_3$, —CH$_2$—CH(CH$_3$)$_2$ and —CH=CH—CH$_3$, said products having therapeutical properties.

11. The compound of the following formula:

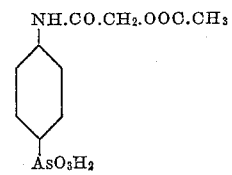

being sparingly soluble in methyl alcohol and glacial acetic acid, very difficultly soluble in ethyl alcohol, readily soluble in acetic acid of 50 per cent strength, insoluble in acetone and ether, melting above 270° C. and having therapeutical properties.

12. The compounds of the following formula:

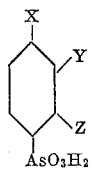

wherein X is a substituent of the group consisting of H, Cl and —NH.CO.CH$_2$O.OC.R, Y is a substituent of the group consisting of H and —NH.CO.CH$_2$.O.OC.R, R being a radical of the group consisting of alkyl and alkylene, and Z is a substituent of the group consisting of methyl and H, only one of the substituents X and Y being —NH.CO.CH$_2$O.OC.R and Z being methyl when Y is H said products having therapeutical properties.

13. The compounds of the following formula:

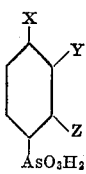

wherein X is a substituent of the group consisting of H, Cl and —NH.CO.CH$_2$O.OC.R, Y is a substituent of the group consisting of H and —NH.CO.CH$_2$O.OC.R, R being a radical of the group consisting of methyl, isovaleryl and crotonyl, and Z is a substituent of the group consisting of methyl and H, only one of the substituents X and Y being —NH.CO.CH$_2$O.OC.R, and Z being methyl when Y is H said products having therapeutical properties.

14. The compound of the following formula:

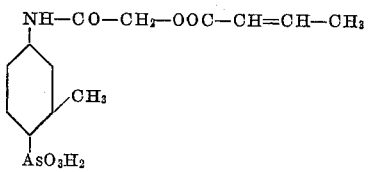

being difficultly soluble in water, more soluble in ethyl alcohol and acetic acid of 50% strength and in glacial acetic acid, insoluble in acetone and ether, melting at 205° C. while decomposing, and having therapeutical properties.

KARL STREITWOLF.
ALFRED FEHRLE.
HUBERT OESTERLIN.